US007690438B2

(12) United States Patent
Bordallo Álvarez

(10) Patent No.: US 7,690,438 B2
(45) Date of Patent: Apr. 6, 2010

(54) METHOD FOR ACTING ON FOREST FIRES, PESTS OR ATMOSPHERIC PHENOMENA FROM THE AIR

(76) Inventor: Luís María Bordallo Álvarez, Islas Baleares n. 4, E-30720 Santiago de la Ribera (ES)

( * ) Notice: Subject to any disclaimer, the term of this patent is extended or adjusted under 35 U.S.C. 154(b) by 123 days.

(21) Appl. No.: 11/795,711

(22) PCT Filed: Jan. 25, 2006

(86) PCT No.: PCT/IB2006/000122

§ 371 (c)(1), (2), (4) Date: Jul. 20, 2007

(87) PCT Pub. No.: WO2006/079899

PCT Pub. Date: Aug. 3, 2006

(65) Prior Publication Data

US 2008/0202775 A1    Aug. 28, 2008

(30) Foreign Application Priority Data

Jan. 26, 2005    (ES)    ............................... 200500143

(51) Int. Cl.
| A62C 2/00 | (2006.01) |
| A62C 25/00 | (2006.01) |
| A62C 35/00 | (2006.01) |
| B64C 31/02 | (2006.01) |
| B64D 45/00 | (2006.01) |
| B64D 1/00 | (2006.01) |

(52) U.S. Cl. ............................. 169/47; 169/53; 169/44; 169/46; 169/11; 244/16; 244/129.2; 244/136; 244/137.3; 244/137.4; 239/171

(58) Field of Classification Search .................. 169/47, 169/53, 44, 46, 11; 244/16, 129.2, 136, 137.3, 244/137.4
See application file for complete search history.

(56) References Cited

U.S. PATENT DOCUMENTS

| 2,091,589 | A | * | 8/1937 | Finzi | ............................ 169/28 |
| 2,306,321 | A | * | 12/1942 | Roberts | ........................ 244/136 |
| 2,349,980 | A | * | 5/1944 | Moore | .......................... 102/382 |
| 2,633,920 | A | * | 4/1953 | Carlson | ........................ 169/33 |
| 2,665,768 | A | * | 1/1954 | Talbot | .......................... 169/36 |
| 3,382,800 | A | * | 5/1968 | Biggs, Jr. | ..................... 102/369 |
| 3,714,987 | A | * | 2/1973 | Mattson | ....................... 169/47 |
| 4,376,466 | A | * | 3/1983 | Hara | ............................. 169/53 |
| 4,836,292 | A | * | 6/1989 | Behringer | ..................... 169/47 |
| 4,936,389 | A | * | 6/1990 | MacDonald et al. | ........... 169/53 |
| 5,549,259 | A | * | 8/1996 | Herlik | .......................... 244/136 |
| 5,590,717 | A | * | 1/1997 | McBay et al. | .................. 169/52 |
| 5,631,441 | A | * | 5/1997 | Briere et al. | ................. 102/336 |
| 5,794,889 | A | * | 8/1998 | Bailey | .......................... 244/136 |
| 5,957,210 | A | * | 9/1999 | Cohrt et al. | .................... 169/44 |
| 6,364,026 | B1 | * | 4/2002 | Doshay | ........................ 169/47 |
| 6,470,805 | B1 | * | 10/2002 | Woodall et al. | .............. 102/370 |
| 6,769,493 | B1 | * | 8/2004 | Fima et al. | ..................... 169/53 |
| 7,121,353 | B2 | * | 10/2006 | Setzer | .......................... 169/28 |
| 2004/0035461 | A1 | * | 2/2004 | Susko | ........................ 137/209 |
| 2005/0072880 | A1 | * | 4/2005 | Nolan | ......................... 244/136 |
| 2006/0162941 | A1 | * | 7/2006 | Sridharan et al. | .............. 169/53 |

FOREIGN PATENT DOCUMENTS

| DE | 4032672 | A1 | * | 4/1992 |
| FR | 2315290 | | | 6/1975 |
| FR | 2315290 | A | * | 2/1977 |
| FR | EP 0320554 | | | 12/1987 |

* cited by examiner

*Primary Examiner*—Dinh Q Nguyen
*Assistant Examiner*—Steven Cernoch
(74) *Attorney, Agent, or Firm*—Nixon & Vanderhye, PC

(57) ABSTRACT

Characterized in that in a first stage are loaded or produced on board in a mother aircraft at least a product or mixed of products to act on forest fires, pests or atmospheric phenomena; in a second stage the said product is stored in a glider container with gliding flight ability and equipped with a precision guidance system; in a third stage the glider container is dropped from the mother aircraft and guided towards the release point of the load; in a fourth stage the glider container releases of its interior the load of product on the release point, and in a fifth stage the glider container is recovered for a following reusing.

14 Claims, No Drawings

METHOD FOR ACTING ON FOREST FIRES, PESTS OR ATMOSPHERIC PHENOMENA FROM THE AIR

This application is a U.S. national phase of International Application No. PCT/IB2006/000122 filed Jan. 25, 2006, which designated the U.S. and claims priority to Spanish Application No. P200500143 filed Jan. 26, 2005, the entire contents of each of which are hereby incorporated by reference.

Method for acting on forest fires, pests or atmospheric phenomena characterized in that in a first stage are loaded or produced on board in a mother aircraft at least a product or mixed of products to act on forest fires, pests or atmospheric phenomena; in a second stage the said product is stored in a glider container with gliding flight ability and equipped with a precision guidance system; in a third stage the glider container is dropped from the mother aircraft and guided towards the release point of the load; in a fourth stage the glider container releases of its interior the load of product on the release point, and in a fifth stage the glider container is recovered for a following reusing.

BACKGROUNDS OF THE INVENTION

Nowadays the firefighting from the air is achieved with aircrafts (hydroplanes or land planes) and helicopters that carry water and drop it in the seat of the fire, usually with chemical additives, such as retardants of the boiling point of water or foamers to make difficult the combustion once the mixed is spread.

In the insect pests situation are used light aircrafts that drop the pesticide or insecticide on the release point.

In the case of acting on atmospheric phenomena are used from medium light aircrafts up to heavy aircrafts or even rockets.

The process must be achieved to a very low height and in "visual flight" conditions that is to say by day in full view of the fire or field to be fumigated and of the surrounding orography.

Once the product is dropped over the area, the aircraft must returns to reload. In the case of fires, water in a swamp, lake or a nearby sea when are used hydroplanes or helicopters or in an airport, aerodrome or a prepared place for this purpose, in the case of land planes but depending on the geographical environment and the infrastructures in the fired area, the average time taken by the aircraft in returning to a dropped position again could be set in not less than fifteen minutes.

In fumigation situation or in acting on atmospheric phenomena the light aircrafts or aircrafts must return to the supplying base to reload the products to be dropped, so it could involve long time-outs between one action and the next one depending on the distance to said base, taking into account also that said phenomena in such cases could be moving (for instance, locusts plague, stormy cloud) what in the same way increases the time between the operations.

Relating to forest fires, with regard to the effective extinction area that an aircraft can undertake, also depends on varied and difficult factors which are hard to evaluate such as the type, quantity and condition of the burning vegetation, the wind, the prevailing smoke and the turbulence, as well as the height and precision of the dropping, what in turn can depend on the orography environment and evidently on the quantity of liquid that the aircraft is able to transport, since it could vary from 500 to 6000 litres, even existing aircrafts with a greater capacity, but with the inconvenient that owing to its big size its maneuverability is limited particularly to a very low height and also due to its size they are land planes requiring a lot of infrastructure to be used. Furthermore, its reaction and rotation times are a lot more higher than those of the small or mediums aircrafts, consequently they are only real effective at very certain geographic or orography environments, therefore for the purposes of the concerning studies the extinguished useful area is considered in a range from the 500 m$^2$ for the helicopters or small planes up to the 2000 m$^2$ in the best of the cases for medium planes. In any case the statistics and data on this matter are few, vague and even contradictory depending on if the source of information comes from the plane builders and contractors or on the other hand operators or official institutions.

In fumigation situations are used light aircrafts that have a relatively limited maneuverability and endurance, as well as they have to fly to a very low height and with peak load, therefore this kind of flight is usually quite risky.

Nowadays, the action on atmospheric phenomena is performed by light aircrafts or conventional aircrafts that generally in the case of, for example, having to act on a stormy cell involves a risk for the air operation.

What is really obvious is the great importance of the air means in the battle against the forest fires, pests and atmospheric phenomena, as well as that the accuracy and opportunity of the dropping and the continuance in these ones are the most important factors to achieve the higher effectiveness.

The closest prior art (European Patent no. EP0320554) refers to the use of fighter-bomber with cylindrical containers charged with a fire-extinguisher agent (water or water with additives) and attached to the fuselage at the hooks used for transporting the armament by the combat airplanes. The fighter goes towards the fire and once on it, it aims with the visor of the fighter on area of fire and according to an angle of diving and pre-established speed throws the container with the water towards the area of fire (as if it was throwing a free-fall bomb which is used in military operations). The mentioned container charged with water realizes a "ballistic" path (not guided) towards the area of the fire. Later, when the container is approximating to the fire and through a delayed fuse at a pre-established time according to the ballistic calculations, the container opens itself to spread its liquid over the fire in order to extinguish it. The container destroys in the air once it has thrown its load.

DESCRIPTION OF THE INVENTION

Each northern or southern summer, the different media inform us about the ravaging of different regions of the globe by devastating forest fires and about the feeling of helplessness and exceeding of the limits of the authorities and the diverse means used to fight against the disasters due to its magnitude.

The present invention is developed in this context and in a global warming that is getting more and more widespread, evident and worrying with sudden and fast changes of the masses of air that cause extreme temperatures that in the summer seasons it results in devastating forest fires, difficult to control and to extinguish with the both air and land conventional means.

In that sense are usually the images of certain places especially the mountainous ones, where the insects and parasites pests damage the woods, such as the pine processionary.

Likewise, phenomena such as hail that damage a harvest, in many occasions just before of the collect of the harvest that causes the ruin of the farmers are usually.

In view of these aspects, it is quite important to have a new method to act on forest fires, pests or atmospheric phenomena from the air that by incorporating modern technologies, provides new solutions to the process limitations that actually have the conventional air means, such as of the meteorological kind (only diurnal operation, clouds, fogs, winds, etc.), of the orography kind (inaccessibility to the fired areas, danger of the flights) or of the operatives kind (reaction times, times between flights).

It is an object of the present invention a method for acting on forest fires, pests or atmospheric phenomena characterized in that in a first stage are loaded or produced on board in a mother aircraft at least a product or mixed of products to act on forest fires, pests or atmospheric phenomena; in a second stage the said product is stored in a glider container with gliding flight ability and equipped with a precision guidance system; in a third stage the glider container is dropped from the mother aircraft and guided towards the release point of the load; in a fourth stage the glider container releases of its interior the load of product on the release point, and in a fifth stage the glider container is recovered for a following reusing.

PREFERRED EMBODIMENT OF THE PATENT APPLICATION

In this preferred embodiment is going to be explained a practical case relating to the extinction of forest fires, although it could be used for the extermination of pests or atmospheric phenomena.

General Description

The 78% of the volume of the atmosphere of the Earth consists of nitrogen. Therefore the inventor by means of the present invention intends to use this natural and inexhaustible source of this inert element in the extinction of the fires.

The current techniques to obtain liquid nitrogen from the air, either by cryogenic procedures or by other non cryogenic processes such as those of absorption or membrane cause generators of this gas which weight and volume allow them to be loaded in transport aircrafts with enough capacity for it.

Once there is onboard the capacity to produce liquid nitrogen in the needed amounts for the operation, it is stored in a "glider container" that basically is a container with gliding flight ability, and with a coupled guidance system that consists of guide flaps and a navigation system able to guide the glider container with liquid nitrogen to a point over the fire where said glider container is released with the object to be turned into a nitrogen gas cloud to high speed and low temperature before to reach the fired area.

The extinction will be achieved by kinetic impact of the cloud of nitrogen to high speed, by a sudden temperature drop, but above all and mainly by the displacement of the needed oxygen for the combustion.

Installation, Production and Storage on Board.

Although any medium or heavy transport aircraft could have the necessary capacity, the appropriate would be an aircraft designed for military operations having square fuselage and back ramp, which facilitates the loading and installation of the required equipment for the production and storage of the required nitrogen.

A transport of these characteristics can provides a useful volume from the 200 m$^3$ and a useful load of 20.000 Kg. or higher, that is enough to be able to keep one or two modern nitrogen generators and the necessary accessories for the operation. Obviously, the installation has to be optimized to reduce to the maximum the weight and volume because of the special characteristics of the present task, but this is easily overcome by making an ad hoc installation, besides to adapt it to operate in the referred pressure and temperature environment.

Regarding to the provide of the required energy for the functioning of these equipments, it can be supplied by the mother aircraft, either by giving electric energy from its auxiliary or main generators and/or by supplying combustible for autonomous generators that produce the necessary electrical or mechanical energy.

The flows of production on board of the liquefied gas supplied by said generators must be enough for the requirements of the referred operation, taking for granted that one or two of these generators are able to supply flows of between 100 and 300 litres per minute.

If in addition, it is considered that the operation can be accomplished to an altitude higher than 10.000 metres then it is obtained that even when the pressure is ¼ atmosphere, the temperature is lower than −50° C., which will make more efficient the liquation of the nitrogen, particularly if cryogenic methods are used, in the same way said liquation will be more inexpensive from the energy point of view. It should be emphasized that the purity of the nitrogen is not a determinant factor in the proposed implementation and therefore it can be discarded to a large extent, what at the same time is going to redound to the aforementioned economy and efficiency.

Once the necessary nitrogen is obtained on board it is stored in glider containers designed for this purpose, which must be flexible and cylindrical; flexible with the intention to resist the pressure and temperature changes during its fast drop towards the release point and cylindrical with the objective to be inserted in a rigid and fairing structure where the gliding wings, the control flaps and the identification systems are attached.

Although according to the operative requirements can be needed several amounts, for the present study it is considered a cylinder 0.8 metres in diameter and 3 metres long, which involves a useful volume of about 1.500 litres of liquid nitrogen (1200 Kg.).

Definition of the Glider Container

There are many and different technologies that could be taking into consideration in both the design of the vehicle and the guidance and safety systems, although according to the simplicity, economy, reliability and viability of the "technology integration" to be developed, are adopted some technologies that because of its spreading and ripeness are generally and habitually used in the aeronautics.

It is known in the development of the technology of the freefall bombs the guided bombs that basically consist of to make moveable the rear flaps of stabilization and to add inside the bomb body a guidance system that sends the appropriated signals to the flaps to give it a certain ability to modify its path in order to reach the assigned object in the area with the minimum possible error.

The initial conception of the glider container referred herewith is a guided bomb with modified airfoils with the purpose to increase its gliding flight range. However a guided bomb is essentially an invention created to be used in a war environment in which the security is not a factor to be taken into account, it means that in the moment that it is dropped from the mother aircraft, if something goes wrong and it is deflected from its trajectory going to a different place to the assigned, it is not foreseeing that such deflection could be corrected, since due to its engineering and design, it is basically autonomous from the release moment, even though has been very high the demonstrated "reliability" of these devices in war operations.

In this case, the setting of the operation is "civil" and "peaceful", for that reason the security is a factor more important than the operation itself, consequently the glider container will be equipped with certain abilities of air vehicles guided by remote control and/or of manned aircrafts with the purpose to achieve a completely secure operation and safe of any error, deflection or unforeseen events, from the moment in which the glider container is dropped from the mother aircraft to the intended release point and the following action of equipment recover.

Besides the gliding flight range which will be explained afterwards, these additional abilities of security are stated below.

$1^{st}$ Ability to transmit in real time the data relating to its flight trajectory to be able to be monitored and corrected from the mother aircraft and/or from the ground.

$2^{nd}$ Automatic ability to detect and avoid other air traffics.

$3^{rd}$ Automatic ability to avoid any collision with the terrestrial surface.

$4^{th}$ Recovery ability, in a safety and effective manner of the fuselage with the equipments once the useful load is dropped.

$5^{th}$ Ability of "emergency mode" by which in a manually or automatically manner, the flight of the glider container is aborted dropping to the air its useful load and recovering the fuselage with the equipments.

All these abilities will be developed and specified in the course of the description of the method.

Dropping and Flight

Although the options and modifications to be considered are varied when the glider container is dropped to air, if as it was previously explained there is an aircraft with back ramp, said back ramp will be used to carry out said dropping reducing at the minimum the necessary modifications in the mother aircraft. The dropping will be able to carry out by means of a drag parachute or a catapult and/or inclined ramp that can be hydraulically or pneumatically operated.

Once in the air, the ability to modify the flight trajectory essentially depends on its aerodynamic design and guidance system as well as the height and dropping method.

In this concrete embodiment is intended to maximize this ability and therefore the glider container that contains the liquid nitrogen would be part of a "fuselage" that in its back would have all the navigation and identification equipment and the control flaps and in its front will have a fixed gliding wings to increase the gliding flight ability to the whole system. With the appropriated aerodynamic surfaces can be taken up to 50 kilometres of practical range of the glider if it is dropped to the air to an enough height, that is, as it was aforementioned, in the case that the operation height be higher than 10.000 metres, therefore it is considered a lift-drag range of 1:5 which is quite low, consequently the required aerodynamic surfaces to achieve said lift-drag range will be of sufficiently reduced dimensions and for that reason will be able to be scramble in the fuselage during the process on board, and with the intention to save space the mentioned flaps will be spread in the air.

During the flight of the glider container, the electric energy required for the operating of the electronic equipment and the actuation of the control flaps will be supplied by batteries and/or wind-powered generator of propeller installed on the outside of the fuselage.

Likewise, the aerodynamic characteristics of said fuselage must be such that allow operating speeds appropriated to the required operations, that is, on the one hand especially to high elevation, must not exceed 0.80 of Mach number to avoid the inherent problems to the appearance of the shock wave and reduction of the maneuverability and on the other hand to manage the power during the gliding flight descent to reach the release area to a sufficiently high speed to perform as effective as possible the dropping of the nitrogen and the subsequent recovering of the vehicle, without in contrast, an speed excess could affect to its maneuverability at a low altitude. Thus, the aerodynamic design of this vehicle must allow it to reach and keep a gliding flight descent rate that should be between the 300 and 400 Kts (550-740 Km/hour).

Guidance

There are different technologies that can be taken into account to guide with the required precision a container filled with liquid nitrogen to a specified area on a fire.

Between all can be considered the following technologies:

a) Laser designation guide, in this case a laser beam is focused in the desired area to direct the vehicle, a receiver on board receives the reflected signals by the laser and commands to direct the vehicle to the laser focused area, it has the inconvenience that it is not completely autonomous because it has to be during the entire flight of the vehicle focusing with a laser the desired area to be reached.

b) Television guide, in this one a television is installed on the vehicle and guided to the objective, in a manually or automatically manner via the received images; it has the inconvenience that the "objective" has to be visible during all the trajectory of the vehicle, in the case of a fire the smoke can keep out of sight the seat of the fire.

c) Autonomous navigation by inertial platform where the position is calculated by accelerometers mounted on inertial platforms that measuring and integrating the produced accelerations in the three axes calculates the position of the vehicle from a one known, although this one is autonomous, at the same time is less exact, more voluminous and more expensive than the satellite navigation.

d) Infrared guidance, the vehicle is guided by a homing head sensitive to the infrareds.

e) Satellite navigation, the position of the vehicle is calculated by the signals received via satellite.

In this case, the satellite navigation and the infrared guidance are considered the most suitable, secure and reliable for this purpose owing to its flexibility, economy and independence.

For it, in the back of the fuselage of the container of nitrogen will be installed the necessary antennas, receivers, processors and servocontrols to capture the signals of the satellites and convert them in commands to the guide flaps.

The "modus operandi" would be by means of a land or aerial observer or even by information obtained via satellite that determines the geographic coordinates of the desired point to direct the "glider" with useful charge of nitrogen; in this case, the coordinates would be the ones of the fire to extinguish.

Once the coordinates are obtained would be transmitted to the aircraft, that through the operator console will input those ones in the memory of the navigator of the glider container, likewise and according to the coordinates of the release point, the coordinates will be inputted from one or several initial point previous to the release point, so that according to orography, meteorology and advance of the fire front to plan the route of the glider container with the intention to optimize the dropping effects. The mother aircraft will drop the glider container when the route composed of the inputted different coordinates is inside the gliding flight ability of the glider container.

Initially it is in the air, when abandon the mother aircraft, the carrier vehicles are completely autonomous to go the objective without help or external correction, but in the present issue, the security is most important that the operation in itself, and therefore it should be able to control and to correct eventually the route of the glider container during all its phases of the flight.

For it will be establish a system of data link between the mother aircraft and the glider container, so that the flight basic parameters and the following positions of the glider be transmitted in real time to the monitor of the mother aircraft and this one at the same time will be able to transmit data to the glider container to, if necessary, to correct its route or even, as will be explained, to abort the flight. In this manner, it will be able to carry out the first of the security additional abilities afore mentioned in the "Definition of the glider container".

If a satellite navigation system is used, the unique that nowadays is really operative, GPS (Global Position System) can be accepted the distance of 15 m, as C.E.P. (Circular error probable) of the glider in the release point of its useful load after its navigation from the mother aircraft.

In a near future, instead of using the American navigation system GPS could be used the European "Galileo" system which will provide more accuracy in the navigation.

For this purpose that is to extinguish a forest fire, a maximum error of 15 metres over the calculated release point, can be assume as irrelevant to the effects of the obtained final results of extinction, above all if the dimensions of the extinguished areas are very superiors to this distance.

Although, on one hand a forest fire is a "live event" in which the unexpected circumstances as the morphology of the forest mass, the ground orography or the meteorological changes can vary its intensity and direction of the advance in a sudden way and on the other hand since the coordinates are determined until the useful load is dropped on top of them, can pass several minutes owing to the reaction time of the system and to flight time of the glider, therefore, with the purpose to correct the release point and to optimize it, the glider will be equipped with a infrared homing head and a laser telemeter.

Both the homing head and the telemeter will be activated in the final phase of the flight to the established coordinates; the infrared seeking will generate the appropriated commands to the guide flaps to correct the established trajectory so that the glider and its useful load are "aimed" to the infrared focal point most active that is found about the established coordinates.

Likewise, the laser telemeter will make possible that the dropping of the liquid nitrogen be carry out to the optimal distance of the mentioned infrared focal point with the intention the extinguish action of the nitrogen be as maximum as possible. Then the accuracy of the dropping is the most important factor at the time to achieve the maximum effective.

Dropping and Extinction

Once in the release point, the glider would drop its entire load in a sudden and concentrated manner over the area to extinguish, in the same way that the aircrafts or helicopters carry out nowadays with its loads of water with retardants or foamers, but with a higher accuracy and much more speed.

Regarding to the extinguish effectiveness of the liquid nitrogen in relation to the water, can be establish an initial comparison, that is if two equal quantities of liquid, one of water with its respective additives and the other of liquid nitrogen are dropped in identical conditions over a fire, the water from a aircraft in a conventional way and the nitrogen from the glider container, in the worst of the cases, the extinguished area by the nitrogen would be equal to the extinguished by the same quantity of water.

All this without taking into account that on the one hand the accuracy in the dropping will be as maximum as possible because as it was mentioned there is ability to aim the entire load to the desired to extinct centre of the infrared focal point and also the load can be dropped to the optimum distance. As well there is another secondary effect that can help with extinguishing action as the condensation of the cooling of the surrounding steam, once that the nitrogen is dropped in the air at a very low temperature.

So, as in the case of the water what really will reach the surface depending on the dropping height is a mix of liquid nitrogen, pulverized liquid nitrogen, nitrogen gas and steam in this case, all this will contact the fired surface to a triple speed to the achieve for the combined of water in a temperature higher than hundred grades lower to the accomplished by the water equivalent, for all this is really assumed that the extinguished area by a determinate quantity of liquid nitrogen will always be a higher percentage to the extinguished by the same quantity of water.

For it will be equipped a glider container as the above mentioned, that is loading 1.500 liters of useful load, as well as that the mentioned glider container arrives to the release point in vertical position or closer to it in such a way that drops all its load, vertically, concentrated on top of the seat of the fire and to the enough distance to convert all the liquid nitrogen in nitrogen gas to a low temperature before to arrives to the fire surface, all this to calculation of the theory effects, then as it was analyzed the practice is more difficult.

Taking into account that the nitrogen gas is distributed in a uniform and spherical manner, it can be considered that in theory the 1500 liters of liquid nitrogen are converted in a sphere of a little more of 15 m of diameter with a volume of 1036.5 $m^3$ (1 liter $N^2$ liquefied=0.691 $m^3$ $N^2$ gaseous).

Although as it was seen at the beginning the extinction effective area can depends of several factors such as orography or of the kind of vegetation, etc., the mentioned sphere of 7.9 m of range and by the effect of the centrifugal expansion of the gases when vertically impact to a great speed on top of the surface, can get an extinction range of two to three times the mentioned sphere range, that is, a circular surface of 15 to 20 meters of range, getting extinguished useful surfaces from the 700 to the 1.300 $m^2$, thus using the 1.500 litres of liquefied $N^2$ the extinguished areas are into the range as seeing before for the case of the dropping of the water from conventional aircrafts.

It has been raised initially a vertical theory dropping, but in the practice more of the cases will be more useful to proper program the navigation of the glider container, with the purpose that this arrive to the release point to low height, in parallel position (or closer to it) to the surface and in parallel direction to the advance of desired fire to extinguish, in such a way that the dropping will be performed in a similar way to the achieved nowadays by the aircrafts and helicopters.

In this case, the extinguished surfaces will be equal or higher to the case of vertical dropping above explained.

Recovering

Once the useful load is dropped the equipment must be recovered, in first place to avoid falling to the surface and can cause some injury and in second place because are a very expensive equipment, for its following reusing in subsequent droppings. For it, the glider container will be equipped with recovering parachutes and security air bag or similar that will unfold in an automatically and sequentially manner once the load is dropped, what would accomplish with the security additional ability of the "Definition of the glider container".

As it was above analyzed from the operative point of view, any intermediate angle between the vertical and horizontal dropping can be considered to the time to operate, the only difference would be the method of recovering. For it, can be taken into account two scenes at the time to recover the equipment, while in the approximations with high angles, that is vertical angles or near to them, the rescue parachute will unfold simultaneously to the drop of the load, giving more impulse to it towards the surface, afterwards before to reach the surface the respective airbags would inflate with the intention of safeguard the onboard equipment in the moment of landing.

In the case of lower angles, that is, horizontally or almost horizontally flights will be programmed the aerial vehicle in such a way that in the moment of the release point and taking advantage of its high speed, to start an operation of vertical rise of several Gs simultaneously to the dropping of the load giving it, as in the above case, more impulse to it to the surface. In this case is going to take advantage of the remainder speed to reach height over the ground, and once to a enough safety height, the rescue parachute and the respective airbags would be unfolded, in such way that the wing will assure to be able to recover all the equipment in the area of the ground not affected yet by the fire.

In normal conditions, the recovery sequence will be activated in a automatic manner after the dropping, but also would have de "emergency mode" mentioned in the security additional abilities $5^{th}$ of the "Definition of the glider container", in such a way that the recovery sequence could be activated manually and at any time during the flight, by the mother aircraft and/or respective land control centre in case of any circumstance or contingency that could affect the security it is decided to abort the flight of the glider container, in such a case the nitrogen will be dropped to the air and the parachutes and the airbags will be activated.

Identification and Security

Because of the navigation will be achieved with a vehicle trough the aerial space, it should be equipped with identification equipment and security measures to avoid that it involves any risk for the aerial navigation as well as to avoid that the useful load and/or its container with the equipment could owing to any kind of error, to reach the land surface in the different programmed place and/or way.

For it, the aerial vehicle will be equipped with a transponder, which is a standard equipment in any aircraft that transmit an electronic code by means of which the glider is identified and followed in any circumstances, at the moment it abandons the mother aircraft, by the radars of land aerial control and as a redundant system to the above described, by the mother aircraft (security additional ability $1^{st}$ of the "Definition of the glider container").

Also, the vehicle will be also equipped with a TCAS (Traffic Control Avoidance System) that is also a standard device in civil aircrafts and detects and process reciprocally the codes of the transponders of the surrounding aircrafts, in a way that by symbols in the navigation display, sound signals through the speakers and/or headphones and finally with "executive orders" alerts and ordering to the crew to avoid the intrusive traffic.

This system acts as a security via, during the aerial traffic operations, in the case that for any unpredicted deflection of the trajectory of an aircraft, lack of coordination of the traffic control or any other unpredicted or unexpected cause, two or more aircrafts approach to undesired distances.

In the final stage, the fourth and executive (the three previous are different and progressive alert stages), the system TCAS acts in a way that if it is calculated that another aircraft is in its trajectory or close enough to it, order in the vertical plane, to the crews of the two aircrafts to get separated between them, that is, an aircraft operate in a way that keeps or increases its height and the other one in the opposite direction, that is that keep or decrease its height, in a way that the aircrafts do not get close to distances that could result dangerous.

In the present case there is a glider container with a basic trajectory of continuous descent towards the release point, therefore the logic of the TCAS will be programmed in order to automatically generate the appropriated commands to the flaps of the glider container with the intention to deflect its trajectory in the improbable case, as will be analyzed, to find an aircraft in the proximities of its route.

If this is a command of increasing the descent, it will not be a problem and it results in a speed increase that subsequently will be corrected at the moment of assume again the new trajectory towards the objective, once the approaching to the intrusive traffic is finished.

If on the contrary, the command would be to keep or increase the height, the vehicle will has, according to its high speed of operation, enough ability to keep or increase said height during the sufficient time, until the distance to the intrusive traffic stop of decreasing, in which case the restrictions would disappear and the autonomous navigation towards the release point would be executed again.

In this second case and as a security redundant element to minimize any probable lack of rising process ability of the glider container, the logical program of the TCAS could be modified so that at the moment that generate commands in the vertical plan can do it at the same time in horizontal plane in such a way to increase in a significant manner the minimum distance reached by the two vehicles. With all this it is achieved the security additional ability $2^{nd}$ of the "Definition of the glider container".

Also, with the intention to make visible the glider at day and night during its entire flying stage, it will be equipped with standard lights as any aircraft that are navigation lights, beacon type lights and flash type lights (stroboscopes). In the same way and with an identical objective to make more visible to the vehicle, at the day light will be equipped with a wake generator, either of smoke kind or of the wake generation by condensation and/or sublimation, being able also to use a minimum quantity of the liquid nitrogen carried on board, at the same time that it can be useful to compensate the fast pressure and temperature changes that will produce the glider container on the liquid nitrogen in its fast descent.

For it, once more time, will be used equipment standard in the civil aircraft, the GPWS (Ground Proximity Warning System) which basically consists in a digital memory of the whole land orography and a processor that continuously calculate the next position of the aircraft by the current position of aircraft provided by a GPS navigator, the flight parameters of it and a complex algorithms. If the processor calculates that in the future trajectory of the aircraft there is any obstacle immediately alerts to the screw in order to avoid the collision by means of lighting and sound signals.

In the present case, should be adopted and simplified the algorithms to the type of flight and approach to the ground performed by the glider container and the signals will be translated in executive commands to the control surfaces to avoid the collision with the surface and/or, depending on the circumstances, to trigger the "emergency mode". With the above mentioned it is achieved the $3^{rd}$ and $5^{th}$ security additional abilities of the "Definition of the glider container" (in its automatic mode).

Coordination

In the aerial operations, of any kind the coordination has a great importance, therefore in the present novel kind of aerial operation the coordination is a factor that should be carefully analyzed.

These days, the aircrafts used in the firefighting act in visual flight conditions and at a low height and although are logically coordinated by the respective agencies of aerial traffic, either in the collection or takeoff operations or in operation in the fire areas, initially should not mean an inconvenient or trouble for the aerial traffic because operate both in the fire areas and in the aerodromes under the mentioned rules of visual flight and they are the are in charge to keep the distance with other aircrafts and with the ground, besides to operate to low height, the interference for the aerial traffic is usually the minimum.

In the present case, as it will be explained, at a higher altitude much more operation, that is why it has been considered the 10.000 meters (equivalent to 320 ground level) as an suitable operative altitude to which or above which should be performed the operation. The vast majority of civil aerial traffics flight at these and higher levels, for that reason the coordination with agencies of aerial traffic control has great importance.

With respect to the control of the mother aircraft it does not mean a minimum inconvenient because it is an aircraft crewed with all the requirements to be controlled by the respective agencies of aerial traffic control and either in awaiting in the fire areas or in the traffic will operate as for example, any civil aircraft, following the given instructions by the respective operators.

In the present invention, the coordination with the agencies of aerial traffic control has a great importance during the flight of the glider container towards the objective, that is, from that the mother aircraft "drops" the vehicle until it gets to the release point of its load over the fire.

Thus, owing to the special characteristics of the current aerial operation, should be set the respective "operative protocols" with the intention to establish on the one hand the appropriate coordination between the respective agency of aerial traffic control and the flight of the mother aircraft and the glider container on the other hand so that:

$1^{st}$ The respective agency of aerial traffic control coordinates all the time the mother aircraft to establish according to the requirements of the traffic and the situation of the fires and operation and remaining area of it.

$2^{nd}$ The agency of aerial traffic control coordinates a free of traffic "walkway" in order to move the glider containers without interference.

$3^{rd}$ The agency of aerial traffic control coordinates with the mother aircraft the assignment to each glider container with a code (different for each one) to be introduced in its transponder, in such a way that in the moment that the mother aircraft drops the glider, it will be displayed in the radar displays of the traffic control and therefore, identified and followed during all its trajectory.

$4^{th}$ As it was above explained, the glider has the ability to receive commands to modify its trajectory or to self-destruct, so the operation protocols must be established so that, through the mother aircraft the respective agency of aerial traffic control could modify, if necessary, the trajectory of the glider and in the same way, to have the ability of, in a emergency case to manually activate the signal to proceed to the self-destruction of the glider, either by direct manner or by the mother aircraft.

$5^{th}$ Still the respective agency of aerial traffic control according to the operation protocols, will be always able to locate, to rise or to move the mother aircraft, to replace the walkways, to modify the trajectories of glider containers, to active its self-destruction or to abort the operation if were required by aerial traffic requirements.

In conclusion, it is understood that with all these safeguards and security systems, the aerial operation of the glider containers will not involve a minimum inconvenient or risk to the aerial traffic and/or goods or the persons in the area.

It is an object of the present invention a method for acting on forest fires characterized in that in a first stage is loaded in a mother aircraft at least a liquid nitrogen generator, in a second stage the liquid nitrogen is produced within the mother aircraft and the liquid nitrogen is stored in a glider container with gliding flight ability and equipped with a precision guidance system, in a third stage the glider container is dropped from the mother aircraft and guided towards to the seat of the fire by means of the mentioned guidance system, in a fourth stage the glider container releases of its interior the liquid nitrogen sprinkling the said liquid nitrogen on the seat of the fire to a high speed displacing oxygen, extinguishing the fire by the lack of oxygen, transforming in a liquid and gaseous mix to low temperature and extinguishing the fire by the kinetic impact of the mix to high speed against the surface, by sudden falling of the temperature and mainly by the oxygen displacement, and in a fifth stage the glider container is recovered for a following reusing.

During the explanation of the different elements it has been described the method of operation of each one of the different stages of it. Next will be explained the method of operation in a real case of the whole system.

Initially with regard to the principles for the operation, these ones should be equal to those ones current employed to extinguish forest fires with conventional aerial means, that is, once a new seat of fire is located via the respective land or aerial vigilance and alerting network or even via satellite, this location is transmitted to the coordination centre so to transmit as fast as possible to the respective aircraft, located in the nearest aerodrome, ready to lift-off or even in orbital flight to reduce the response times.

The above mentioned can be considered as the typically "modus operandi" in the case of appearance of a new seat of fire. In case of one or several fires already declared, the operation is transformed in a continuous coming and going of aircrafts, properly coordinated, between the seats of the fires and the respective water reload points.

In the case of the proposed mother aircraft, the initial availability would be practically the same, although because of its dimensions and operative characteristics should have to take off from an airport or runway of enough dimensions that in some cases can involve a higher distance to the fire area but it should not involve a increasing of the response time owing to its higher speed (at least the double) with regard to the smallest aircrafts.

During the flight of the mother aircraft to the operation area and once is reached the sufficient altitude, the liquid nitrogen generators will be activated on board as well as the glider containers will be loaded with the said liquid. Also, the aircraft will coordinate with the respective agencies of aerial traffic to flight as soon as possible to the operation area, to establish the orbit area of the mother aircraft and the walkway between the aircraft and the fire area to the flight of the carrier vehicles with the nitrogen on board. Likewise, the mother aircraft will keep in contact with the centre that coordinates the firefighting in order to keep up to date the information about the correct coordinates of the referred fire and introduce it in the memory of the navigator of the glider container just before to abandon the mother aircraft.

Once in the fire area is the place where the extinction method with liquid nitrogen provides the great operative advantage of not having to displace to reload water, being able, because these aircrafts have a great endurance, to be flying over the fire area for several hours that can be tens of hours if the aircraft is equipped with refueling in flight as it is usual in this type of big aircrafts of military transport and also the crew can be increased in order to both pilots and crew could have resting periods during the flight, and in this manner to be able to bear long periods in the air.

When the mother aircraft has filled the glider containers with the liquid nitrogen and has introduced in the memory of its navigators the coordinates of the seat of the fire and when it is situated to a distance lower to that of the carrier vehicles gliding flight, will drop these ones through the back ramp, beginning in this way its autonomous flight towards the seat of the fire.

The nitrogen dropping flow on the fire area, in the present case, will depend on the previous storage capacity of the aircraft, as well as on its production ability by the on board generators, but in any case, it will never be lower than that obtained with several medium or small aircrafts. In the same way, there is always the possibility to drop "in broadside" several glider containers in a very successively manner with the intention to increase the extinction effectiveness of each one, avoiding in this way to give time to fire revival. Also, if necessary and depending on its situation and operative altitude, only one aircraft can take care of more than one fire simultaneously.

When one or several glider containers are in the air, its trajectory will be controlled by the data link and the transponder, both by the mother aircraft and by the respective agency of aerial traffic control, allowing in the first case to correct the trajectory if necessary or even to update the coordinates of the fire during the flight of the glider container or in both cases to active, if necessary, the emergency mode by means of which the nitrogen will be dropped to the air and the parachute and the airbag will be activated. The data link and the transponder will keep on transmitting until to reach the ground to know in all moment the trajectory of the parachute as well as its final position in the surface to make easier the recovery.

As soon as the glider container reaches the fire area and navigates throughout the initial points established with the purpose to fight against the fire in the most suitable direction at the same time that avoid any orthographic obstacle, the homing head of infrareds is activated in the last metres of its planned trajectory with the intention to focus all the useful load to the most active infrared point of the fire located in the surrounding area of the established coordinates of dropping.

At the time the load is dropped on the fire, the glider container will initiate the recovery sequence by means of which the parachute and the respective airbag will unfold and will continue emitting its position until to reach the surface with the purpose to make easier the recovering for its following reusing.

With regard to the operation, at a higher altitude will be achieved more endurance at the moment of staying over the fire area, more speed in the displacement from one place to the other, more operating range of the glider containers and more easiness to generate nitrogen, but logically will be needed more coordination efforts with the agency of aerial traffic control.

Because of the characteristics of the glider containers the operation can be performed at any time of the day and under any meteorological condition (clouds, fog, smoke, wind, etc.), and above all in conditions of severe turbulence along with smoke, which are the conditions present in a fire surrounding area and that often make difficult, and obstruct or even impede the operations of the crewed aircrafts or helicopters. Because there is not any risk for human lives the glider container can be programmed in order to independently of turbulences, smokes or streams get closer the most possible to the seat of the fire with the purpose to achieve the maximum accuracy and effectiveness to the dropping.

Thus considering that where are really obtained the maximum operative advantages with regard to the conventional methods is in the night flight operation that is when the conventional aircrafts can not operate, the aerial traffic is reduced to the maximum and the meteorological conditions are the best for the extinction when the winds abate and the turbulences and atmospheric phenomena decrease.

The present invention, owing to the use versatility of the glider container, can be applied with others substances and in others different fields to the extinction of forest fires from the air with liquid nitrogen described in this method, being understood that said substances and/or fields are also within the scope of the claims of the present method.

Would be enough just replacing the used liquid (in this case the liquid nitrogen) by any other solid, liquid or gaseous substance that can be transported by the glider container to any place of the atmosphere or land surface.

Regarding to the use of other different substances to the liquid nitrogen to extinguish the forest fires, could be mentioned as the solid ones, the powdered carbon dioxide and as the liquid ones, the water or as well the water with additives, and as the gaseous ones the halon gas. Are also included any other agent or substance of the used to extinguish fires.

With regard to the using of the glider container in other different fields to the forest fires extinction, those ones could be the meteorological, carrying solids as silver iodide or powdered calcium chloride or in solution, powdered dry ice (again carbon dioxide) or liquid state gases (for example propane) or gaseous to drop its load over storms, fogs or another atmospheric phenomenon with the purpose to fight of change the development of those phenomena. These tasks currently achieve by aircrafts or conventional light aircrafts or even small rockets, could be performed in the present case considering with higher accuracy, security, independence, speed and effectiveness.

Likewise, the glider container could be used to transport powdered, in liquid or even gaseous pesticides with the intention to apply the agents to exterminate the insect plagues (for example locust, mosquitoes, etc.) or to exterminate a lot of forest and agricultural pests. This option would be better than the conventional methods because it will provide as above mentioned a higher accuracy, security, independence, speed and effectiveness to the aerial operation.

For all the above explained, can be concluded that there are many and important operative advantages provided by this novel method.

The present invention, owing to its versatility can be applied to other fields, being understood that are also within the scope of the claims, only replacing the used product with the required. Said fields could be the extinction of fires, the meteorological one (to disperse thick fogs), the pesticides one (to eliminate insect plagues, such as locust, etc.).

The invention claimed is:

1. A method of delivering a material payload to a selected position on the ground using a reusable delivery device, comprising:
   loading an aircraft with at least one reusable delivery device;
   flying the aircraft to an area above the selected position;
   releasing the at least one reusable delivery device from the aircraft;
   causing the at least one reusable delivery device to travel from the aircraft to a location over the selected position on the ground;
   transmitting a payload release signal from a remote location to the at least one reusable delivery device;

receiving the payload release signal at the at least one reusable delivery device and using the release signal to trigger the release of the material payload;

transmitting guidance signals from the remote location to the at least one reusable delivery device after it has released its material payload; and receiving the guidance signals at the at least one reusable delivery device, and using those guidance signals to selectively move flight control surfaces of the at least one reusable delivery device to guide the at least one reusable delivery device from a location over the selected position to a location apart from the selected position.

2. The method of claim 1, further comprising loading the at least one reusable delivery device with a material payload while it is located inside the aircraft.

3. The method of claim 2, wherein the selected position on the ground is a fire, the method further comprising generating liquid nitrogen onboard the aircraft using a nitrogen generating device, and wherein the step of loading the at least one reusable delivery device comprises loading the at least one reusable delivery device with the generated liquid nitrogen.

4. The method of claim 1, wherein the step of causing the at least one reusable delivery device to travel from the aircraft to a location over the selected position comprises:

illuminating the selected position with a laser designator; and activating a laser guidance system onboard the at least one reusable delivery device, wherein the laser guidance system selectively moves flight control surfaces of the at least one reusable delivery device to guide the at least one reusable delivery device from the aircraft to a location over the selected position by homing in on the laser designator.

5. The method of claim 1, wherein the step of causing the at least one reusable delivery device to travel from the aircraft to a location over the selected position comprises:

activating a video system on board the at least one reusable delivery device, wherein the video system transmits a video signal that shows a field of view around the at least one reusable delivery device;

receiving the video signal at a remote control position;

sending guidance signals from the remote control position to the at least one reusable delivery device, the guidance signals being based on the received video signal, wherein the guidance signals cause selective movement of flight control surfaces of the at least one reusable delivery device to guide the at least one reusable delivery device from the aircraft to a location over the selected position.

6. The method of claim 1, wherein the selected position on the ground is a fire, wherein the step of causing the at least one reusable delivery device to travel from the aircraft to a location over the fire comprises activating an infrared homing device in the at least one reusable delivery device, wherein the infrared homing device senses a position of the fire and selectively moves flight control surfaces of the at least one reusable delivery device to guide the at least one reusable delivery device from the aircraft to a location over the fire.

7. The method of claim 1, wherein the step of causing the at least one reusable delivery device to travel from the aircraft to a location over the selected position comprises:

transmitting guidance signals from a remote location to the at least one reusable delivery device after it has been released from aircraft; and receiving the guidance signals at the at least one reusable delivery device, and using those guidance signals to selectively move flight control surfaces of the at least one reusable delivery device to guide the at least one reusable delivery device from the aircraft to a location over the selected position.

8. The method of claim 1, further comprising causing the at least one reusable delivery device to deploy a parachute after it has released its material payload and moved to a location apart from the selected position.

9. The method of claim 1, further comprising causing the at least one reusable delivery device to deploy an inflatable airbag that will cushion the at least one reusable deliver device as it lands after it has released its material payload and moved to a location apart from the selected position.

10. The method of claim 1, wherein the step of loading an aircraft with at least one reusable delivery device comprises loading the aircraft with a reusable delivery device that is in the form of a glider with movable flight control surfaces which can be used to control a descent of the glider once it is released from the aircraft, the glider being capable of carrying and releasing a material payload.

11. The method of claim 10, wherein the step of causing the at least one reusable delivery device to travel from the aircraft to a location over the selected position comprises activating a guidance system onboard the glider that selectively moves the flight control surfaces to guide the glider from the aircraft to a location over the selected position.

12. The method of claim 1, further comprising causing the at least one reusable delivery device to deploy a parachute after it has released its material payload and moved away from a location over the selected position.

13. The method of claim 1, further comprising causing the at least one reusable delivery device to deploy an inflatable airbag that will cushion the at least one reusable deliver device as it lands after it has released its material payload and moved away from a location over the selected position.

14. A method of delivering a material payload to a selected position on the ground using a reusable delivery device, comprising:

loading an aircraft with a reusable delivery device that is in the form of a glider with movable flight control surfaces which can be used to control a descent of the glider once it is released from the aircraft, the glider being capable of carrying and releasing a material payload;

flying the aircraft to an area above the selected position;

releasing the at least one reusable delivery device from the aircraft;

activating a guidance system onboard the glider that selectively moves the flight control surfaces to guide the glider from the aircraft to a location over the selected position, wherein the guidance system also automatically generates signals that cause the glider to release a material payload once the glider is positioned over the selected position, and wherein after the material payload has been released, the guidance system also selectively moves the flight control surfaces to guide the glider from a location over the selected position to a location on the ground apart from the selected position, from which it can be recovered and reused.

* * * * *